(No Model.)

D. B. SMITH.
EGG SAFE.

No. 374,210. Patented Dec. 6, 1887.

WITNESSES.
Rich. George
Edwin H Risley

INVENTOR.
Dewane B Smith
By Risley Love Pany
Attys

N. PETERS, Photo-Lithographer, Washington, D. C.

UNITED STATES PATENT OFFICE.

DEWANE B. SMITH, OF UTICA, NEW YORK, ASSIGNOR TO J. M. CHILDS & CO., OF SAME PLACE.

EGG-SAFE.

SPECIFICATION forming part of Letters Patent No. 374,210, dated December 6, 1887.

Application filed April 2, 1887. Serial No. 233,401. (No model.)

*To all whom it may concern:*

Be it known that I, DEWANE B. SMITH, of the city of Utica, in the county of Oneida and State of New York, have invented certain new and useful Improvements in Cases or Safes for Storage of Eggs; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improved case or safe for the storage and preservation of eggs.

Heretofore frequent handling of the eggs has been necessary, and the manner in which it has been done involved more or less breakage and expense. It is an admitted fact that if eggs are frequently handled, or, in other words, their positions reversed, they can be preserved in a fresh condition for an indefinite period of time and without the use of lime or other objectionable chemicals or salts.

My device accomplishes the purpose of preserving the eggs in a neat, cheap, and inexpensive manner by the use of the mechanism and devices hereinafter more fully pointed out, described, and claimed.

Figure 1:
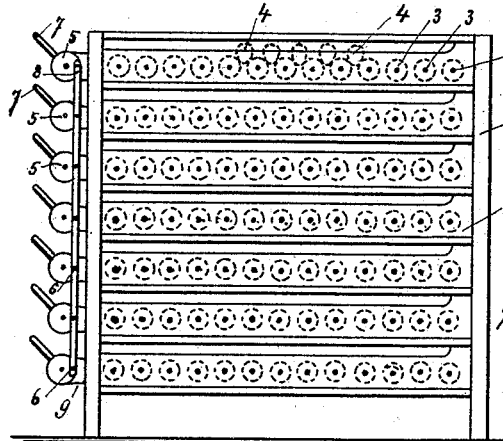
Figure 2:
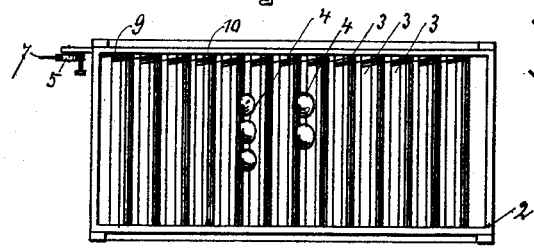
Figure 3:
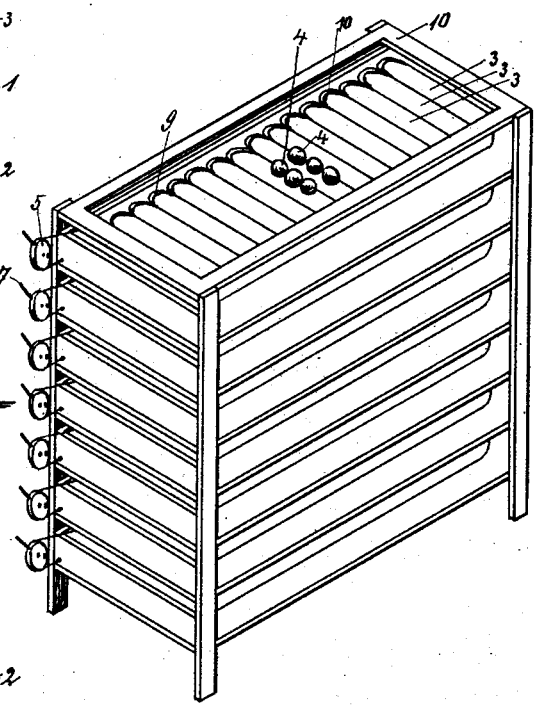
Figure 4:
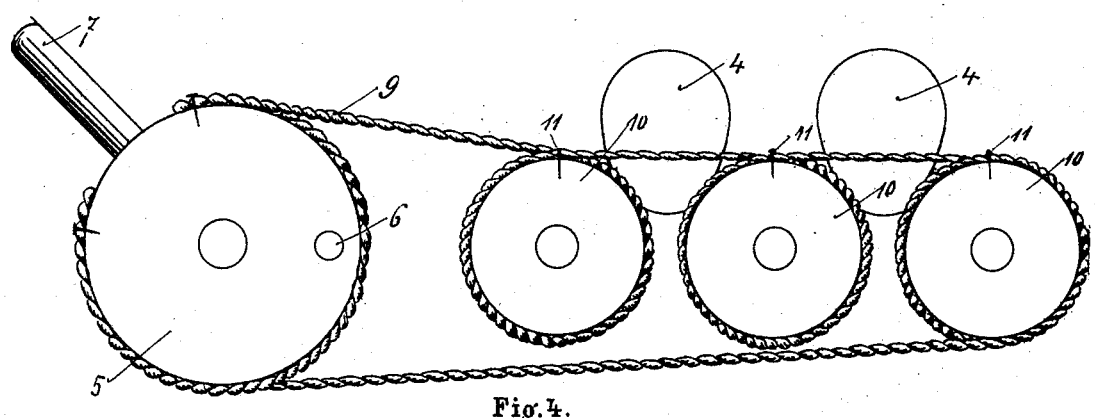

In the accompanying drawings, Figure 1 represents a side elevation of my improved safe. Fig. 2 represents a plan view. Fig. 3 shows the same in perspective, and Fig. 4 shows a detail in side elevation of the mechanism used to impart a rotary motion to the rollers upon which the eggs lie.

Like figures refer to like parts in the several drawings.

My device consists, essentially, in a case or cabinet, 1, Figs. 1 and 3, so constructed as to admit of the reception of bottomless drawers or slides 2, Figs. 1 and 2, and shown in plan in Fig. 2. Extending from side to side across the drawers, and pivoted at each end to the sides thereof in such manner as to admit of their free rotation, I provide rollers 3 3 3, Figs. 1, 2, and 3. These rollers are so spaced that the eggs can lie thereon, as shown at 4, Figs. 1, 2, 3, and 4.

Pivoted in a suitable manner to the outside or front of the drawers, and in approximately the same horizontal plane as that of the drawers, I provide actuating rollers or disks 5, Figs. 1, 2, 3, and 4, the same being susceptible of rotation. At or near the periphery of these rolls or disks I provide projecting studs or pins 6, Figs. 1 and 4.

Projecting in a radial direction from the periphery of disk 5, I provide actuating lever or handle 7, Figs. 1, 2, 3, and 4. I also provide a properly-perforated strip, 8, Fig. 1, of wood or other suitable material, the purpose of which is to engage pin 6 on disk 5 and combine them together. The evident result of this arrangement is that rotative motion communicated to any one of the disks 6 is, by reason of the perforated combining-strip 8, transmitted to each and every one of the series of disks thus combined and moves them all in unison. It is equally obvious that the removal of the combining-strip 8 renders each of the disks 5 capable of separate and independent movement.

Wholly or partly encircling disks 5, and suitably attached thereto, I provide a flexible cord or cable, 9, Figs. 1, 2, 3, and 4. This cable is of sufficient length to extend back and encircle or enwrap each of the series of rollers contained in the drawers, as shown at 10, Figs. 2, 3, and 4. The cable 9 is attached to each of the rollers by nail or pin 11; but I can use any other suitable means of fastening than the nail or pin. The evident result of this arrangement of the cable is that any rotative motion communicated to disks 5 is, by reason of the connecting-cable 9, communicated to rollers 3 3 3, causing them to rotate more or less, depending upon the amount of rotation communicated to disks 5.

The operation of my device is as follows: Strip 8 is first removed, when each of the separate drawers can be separately removed, filled with eggs, and replaced. When so replaced, the perforated strip 8 is engaged with pin 6 upon disk 5, when motion communicated to any one of the handles 7 actuates and rotates all of the rollers in the combination. The eggs lying upon the periphery of the rollers, as shown, must partake of the same rotary motion, and consequently must have their positions reversed. Removal of combining-strip 8 renders each drawer and its series of rollers susceptible of separate and independent operation.

It is evident that my device admits of much structural change without departing from the spirit of my invention; hence I do not confine myself to the precise specific construction herein described.

What I claim as new, and desire to secure by Letters Patent, is—

In a safe for storing eggs, the combination of a series of drawers having rollers therein, the encircling cable surrounding each of the rollers and attached to the operating-disks, the operating-disk with projections, and the perforated combining-strip for engaging the projections, substantially as set forth, for the purposes stated.

In witness whereof I have affixed my signature in presence of two witnesses.

DEWANE B. SMITH.

Witnesses:
EDWIN H. RISLEY,
D. McGUCKEN.